United States Patent
Wisniewski et al.

(10) Patent No.: US 9,978,547 B1
(45) Date of Patent: May 22, 2018

(54) BATTERY POWERED KEYPAD ASSEMBLY

(71) Applicant: Crestron Electronics, Inc., Rockleigh, NJ (US)

(72) Inventors: Stan Wisniewski, Pompton Plains, NJ (US); Russikesh Kumar, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 100 days.

(21) Appl. No.: 15/342,639

(22) Filed: Nov. 3, 2016

(51) Int. Cl.
*H05K 5/02* (2006.01)
*H01H 23/14* (2006.01)
(Continued)

(52) U.S. Cl.
CPC ............ *H01H 23/145* (2013.01); *H01H 3/22* (2013.01); *H01H 23/04* (2013.01)

(58) Field of Classification Search
CPC ............ H02G 3/08; H02G 3/10; H02G 3/081; H02G 3/083; H02G 3/12; H02G 3/123; H02G 3/14; F16L 5/00; F16M 13/02; H05K 5/00; H05K 5/02; F24F 11/02; H01H 23/145; H01H 3/22; H01H 23/04
USPC ......... 174/50, 480, 481, 489, 503, 520, 559, 174/560, 504, 50.52; 220/3.2, 3.3, 3.8, 220/4.02; 248/906, 343; 361/679.01, 361/679.02, 600, 601
See application file for complete search history.

(56) References Cited

U.S. PATENT DOCUMENTS 6,000,807 A * 12/1999 Moreland ................ H01H 9/18
362/85
6,183,101 B1 * 2/2001 Chien ...................... H02G 3/14
362/84
(Continued)

OTHER PUBLICATIONS

Crestron, Cameo® Keypads, C2N-CBD-P/C2N-CBD-P-KP/C2N-CBD-E/C2N-CBF-P/C2N-CBV-P, Installation & Operation Guide, 05.15.
(Continued)

*Primary Examiner* — Angel R Estrada
(74) *Attorney, Agent, or Firm* — Crestron Electronics, Inc

(57) ABSTRACT

A battery powered control device configured to be mounted on a wall comprising a front housing cover comprising a vertical wall and a bezel frame extending therefrom, a button assembly, a circuit board, and a rear housing plate. The button assembly is located within the bezel frame and comprises at least one button protruding through an opening in the bezel frame. The circuit board is located within the bezel frame behind the button assembly and comprises at least one tactile switch configured for being depressed by the at least one button. The rear housing plate is mounted within the front housing cover such that a periphery of the rear housing plate fits within and is surrounded by a peripheral wall of the front housing cover and a rear surface of the rear housing plate is substantially flush with the terminal end of the peripheral wall of the front housing cover. The battery powered control device further comprises a battery receiving channel located on one side of the bezel frame and configured for guiding a battery through a battery receiving opening in the front housing cover and into a battery compartment located between the circuit board and the rear housing plate.

31 Claims, 8 Drawing Sheets

(51) Int. Cl.
*H01H 3/22* (2006.01)
*H01H 23/04* (2006.01)

(56) References Cited

U.S. PATENT DOCUMENTS

| | | | |
|---|---|---|---|
| 7,432,463 | B2 | 10/2008 | Clegg et al. |
| 7,910,849 | B2 | 3/2011 | Hibshman et al. |
| 8,149,591 | B2 | 4/2012 | Feldstein et al. |
| 8,158,883 | B2 * | 4/2012 | Soffer .................... H02G 3/123 |
| | | | 174/480 |
| 8,289,192 | B2 | 10/2012 | O'Donnell |
| 8,389,857 | B2 | 3/2013 | Petrillo |
| 8,754,816 | B2 | 6/2014 | Feldstein et al. |
| 8,802,980 | B2 * | 8/2014 | Shivell .................... H02G 3/14 |
| | | | 174/55 |
| 9,361,790 | B2 | 6/2016 | Altonen et al. |
| 9,699,864 | B2 * | 7/2017 | Camden ................ H05B 37/02 |

OTHER PUBLICATIONS

Crestron, Wireless In-Wall Dimmer, CLW-DIMEX-230-E/P, Installation Guide, 2013.

* cited by examiner

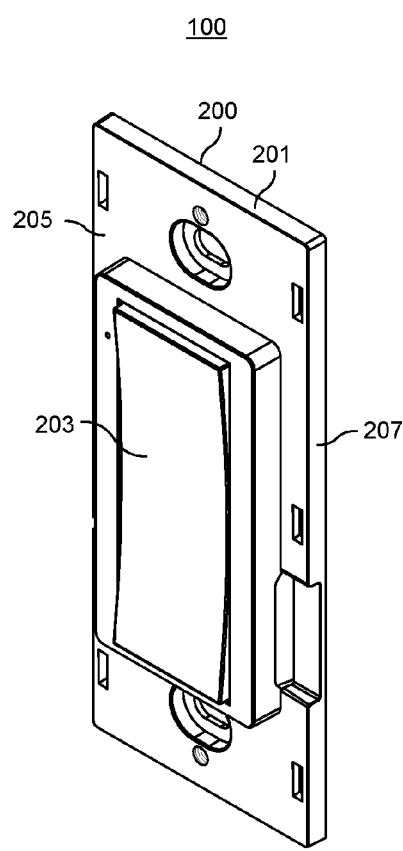
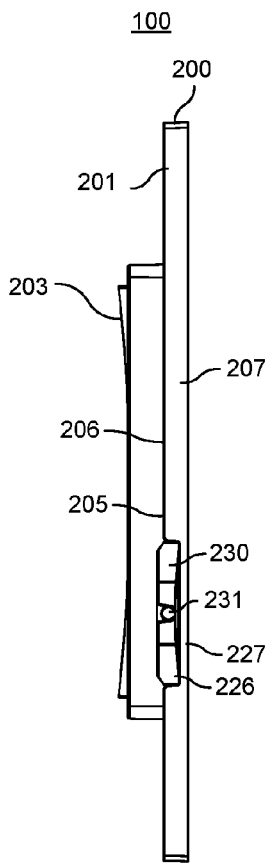
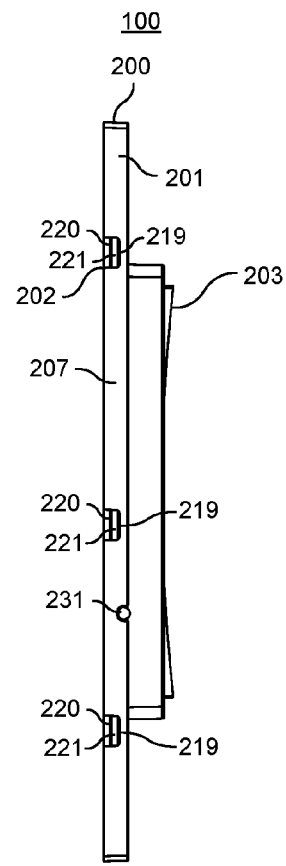
FIG. 4　　　FIG. 5　　　FIG. 6
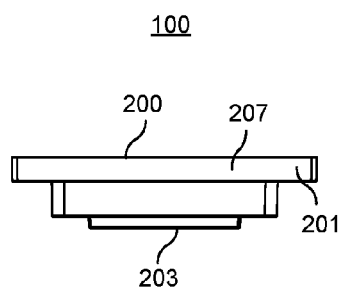
FIG. 7

BATTERY POWERED KEYPAD ASSEMBLY

BACKGROUND OF THE INVENTION

Technical Field

Aspects of the embodiments relate to wall mounted battery powered control devices, and more specifically to a battery powered keypad assembly with a removable battery.

Background Art

The field of home automation is rapidly developing. The ability to control electrical fixtures, appliances, and electronics remotely is becoming more and more common place. Wall mounted switching devices, such as light switches and dimmers, are typically placed inside a junction box or a mounting fixture. In commercial construction, metal wall boxes are often used. These switching devices typically include control circuitry and processors powered by internal power supplies that derive power from high voltage wiring, which is typically 120 Volts alternating current (VAC) in the United States.

In today's fast paced environment, space dynamics often change and require simple and easy to install lighting systems. In such applications, battery powered devices, such as wall light switches and dimmers, are ideal because they do not require existing junction boxes or wires. However, such devices are typically bulky and unseemly as they do not resemble the remainder of light switches and dimmers installed in a space. Additionally, they require batteries, which are not convenient to access or easy to replace. Some require special tools to access the batteries. Others come with battery trays or removable parts that can get easily lost during battery replacement. Yet, others expose electronics during battery replacement which can be tampered with, resulting in a non-operative device.

Therefore, a need has arisen for a battery powered keypad assembly with a removable battery.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for wall mounted battery powered control devices, and more particularly a battery powered keypad assembly with a removable battery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to a first aspect of the embodiments, a battery powered control device (100) configured to be mounted on a vertical surface is provided. The battery powered control device (100) comprises a front housing cover (201), a button assembly (203), a circuit board (204), and a rear housing plate (202). The front housing cover (201) comprises a vertical wall (206) comprising a first opening (212a); a peripheral wall (207) traversely extending from a periphery and a rear surface (209) of the vertical wall (206) to a terminal end (208); and a bezel frame (104) traversely extending from a front surface (205) of the vertical wall (206) and comprising a front bezel wall (214) surrounded by a peripheral bezel wall (215) traversely extending from the first opening (212a) to the front bezel wall (214), the front bezel wall (214) comprises a second opening (212b) aligned with and smaller than the first opening (212a). The button assembly (203) comprises at least one button (241a), wherein the button assembly (203) is located within the bezel frame (104) with the at least one button (241a) protruding through the second opening (212b) in the bezel frame (104). The circuit board (204) is located within the bezel frame (104) behind the button assembly (203). The rear housing plate (202) is mounted within the front housing cover (201) such that a periphery of the rear housing plate (202) fits within and is surrounded by the peripheral wall (207) of the front housing cover (201), wherein the rear housing plate (202) comprises a platform wall (271) transversely extending from a front surface (210) of the housing plate (202) into the bezel frame (104), wherein the platform wall (271) abuts a rear surface (253) of the circuit board (204).

According to an aspect of the embodiments, the rear housing plate (202) fits within the front housing cover (201) such that a rear surface (211) of the rear housing plate (202) is substantially flush with the terminal end (208) of the peripheral wall (207) of the front housing cover (201). The peripheral wall (207) may comprise hooks (217) extending from its inner surface, wherein a rear surface (211) of the rear housing plate (202) comprises notches (216) formed along its periphery and sized and configured to receive the hooks (217) of the front housing cover (201) such that the rear housing plate (202) is snapped into the front housing cover (207). The platform wall (271) may support the circuit board (204) substantially along its periphery and at a distance from the rear housing plate (202) forming a space (274) between the circuit board (204) and the rear housing plate (202), wherein the space (274) provides room for electronic components extending from the circuit board (204).

According to another aspect of the embodiments, at least two corners of an inner surface of the bezel frame (104) may comprise posts (235) extending therefrom, wherein the button assembly (203) comprises at least two notched corners (249) sized to fit about posts (235), and wherein at least two corners of the circuit board (204) comprise holes (259) extending therethrough and sized and configured for receiving the posts (235). Additionally, an inner surface of the bezel frame (104) may comprise at least two projections (237) extending therefrom, wherein the button assembly (203) comprises at least two wells (245) in its side edges sized and configured to receive the corresponding projections (237).

According to an aspect of the embodiments, the button assembly (203) may comprise two parallel longitudinal portions (243) interconnected via at least one lateral portion (244), wherein the at least one button (241a) comprises a free unconnected end (246) and an attached end (247) connected to the at least one lateral portion (244), wherein the free end (246) is configured to pivot with respect to the lateral portion (244). The front surfaces of the longitudinal portions (243) of the button assembly (203) may abut an inner surface of the front bezel wall (214) of the bezel frame (104), and wherein rear surfaces of the longitudinal portions (243) of the button assembly (203) abut a front surface of the circuit board (204) along its outer edges. According to an embodiment, the button assembly (203) may comprises a rocker switch actuator (102) comprising two buttons (241, 241b) sharing a continuous front surface. According to an embodiment, the at least one button (241a) comprises an abutment (248) extending from its rear surface and configured for depressing a tactile switch (250a) located on a front surface (252) of the circuit board (204). According to another embodiment, the battery powered control device (100) is configured for receiving one of a plurality of button assemblies (203, 1100, 1200) of various button counts and layouts, wherein the front surface (252) of the circuit board (204) comprises a plurality of tactile switches (250a-f) at locations corresponding to locations of abutments (248, 1107, 1207) of each button of the plurality of button assemblies (203, 1100, and 1200).

According to an aspect of the embodiments, the front housing cover (201) comprises a battery receiving opening (230) located on one side of the bezel frame (104) and configured for receiving a battery (213) into a battery compartment (272) located within the battery powered control device (100). When fully inserted the battery (213) may reside within the battery compartment (272) between the front surface (210) of the rear housing plate (202) and the rear surface (253) of the circuit board (204). According to an embodiment, the front housing cover (201) comprises a battery receiving channel (226) comprising a recessed wall (227) settled below the front surface (205) of the vertical wall (206) and configured for guiding the battery (213) through the battery receiving opening (230), wherein the recessed wall (227) extends from a first end (228) that is notched into the peripheral wall (207) to a second end (229) that terminates at the battery receiving opening (230). The battery receiving opening (230) may extend partially through the peripheral bezel wall (215) of the bezel frame (104) and is partially formed by a recess of the second end (229) of the battery receiving channel (226). A rear surface of the recessed wall (227) may be substantially on the same plane as the terminal end (208) of the peripheral wall (207) of the front housing cover (201).

According to an embodiment, the rear housing plate (202) may comprise a cutout (270) sized to receive the recessed wall (227) of the battery receiving channel (226) such that a rear surface of the recessed wall (227) resides substantially on the same plane as a rear surface (211) of the rear housing plate (202). The battery compartment (272) may be located within the platform wall (271) of the rear housing plate (202) and comprises a rear wall (281) formed in the rear housing plate (202) and peripheral side walls (282) traversely extending from the front surface (210) of the rear housing plate (202) and surrounding the battery compartment (272), wherein the platform wall (271) comprises a side opening (273) configured for permitting the battery (213) to be inserted into the battery compartment (272). According to an embodiment, a front surface of the recessed wall (227) of the battery receiving channel (226) is aligned with a front surface of the rear wall (281) of the battery compartment (272). The rear wall (281) may comprise a thickness substantially equal to a thickness of the recessed wall (227) of the battery receiving channel (226). The rear wall (281) of the battery compartment (272) may comprise a retaining ridge (283) slightly raised above a front surface of the rear wall (281) and configured for retaining the battery (213) within the battery compartment (272).

According to an embodiment, the rear surface (253) of the circuit board (204) comprises a metal contact surface (261) and a battery retainer strap (262) positioned over the metal contact surface (261) such that when inserted the battery (213) resides between the metal contact surface (261) and the battery retainer strap (262), wherein the battery compartment (272) of the rear hosing plate (202) fits over the metal contact surface (261) and the battery retainer strap (262). The battery retainer strap (262) may comprise a battery guiding flange (263) extending from an edge of the battery retainer strap (262) and bent away from the metal contact surface (261), wherein the battery guiding flange (263) is configured for guiding the battery (213) between the metal contact surface (261) and the battery retainer strap (262). The rear wall (281) of the battery compartment (272) may comprise a retaining recess (284) recessed below a front surface of the rear wall (281) and sized and configured for receiving a portion of the battery retainer strap (262).

According to an aspect of the embodiments, the front housing cover (201) comprises a battery extracting opening (234) in communication with the battery compartment (272) and aligned with and located on an opposite side of the bezel frame (104) from the battery receiving opening (230), wherein the battery extracting opening (234) is configured for receiving a longitudinal object into the battery compartment (272) to push the battery (213) out of the battery compartment (272) through the battery receiving opening (230). According to an embodiment, the front housing cover (201) comprises a first battery extracting channel (231) recessed into the front surface (205) of the vertical wall (206) and aligned with and located on an opposite side of the bezel frame (104) from the battery receiving channel (226), wherein the first battery extracting channel (231) is configured for guiding a longitudinal object through a battery extracting opening (234) in the front housing cover (201) and into the battery compartment (272) to push the battery (213) out of the battery compartment (272) through the battery receiving opening (230), wherein the first battery extracting channel (231) extends from a first end (232) notched in the peripheral wall (207) of the front housing cover (201) to a second end (233) that terminates at the battery extracting opening (234). The battery extracting opening (234) may be partially cut into the peripheral bezel wall (215) of the bezel frame (104) and is partially formed by the recess of the second end (233) of the first battery extracting channel (231). The rear housing plate (202) may comprise a second battery extracting channel (275) traversely extending from the front surface (210) of the rear housing plate (202) and longitudinally extending from a first end (276) aligned with the first battery extracting channel (231) to a second end (277) aligned with the battery compartment (272), wherein the first end (276) of the second battery extracting channel (275) is notched in the platform wall (271) and wherein the second end (277) of the second battery extracting channel (275) is notched in a peripheral side wall (282) of the battery compartment (272).

According to an embodiment, the battery powered control device (100) is configured for being covered by a faceplate (106) comprising an opening (108), wherein the bezel frame (104) is sized and shaped to fit within the faceplate opening (108) such that a front surface of the front bezel wall (214) is substantially flush with a front surface of the faceplate (106), and wherein the battery powered control device (100), excluding the at least one button (241a) protruding from the bezel frame (104), is configured for substantially residing within the faceplate (106).

According to a further aspect of the embodiments, a battery powered control device (100) configured to be mounted on a vertical surface is provided. The battery powered control device (100) comprises a front housing cover (201), a button assembly (203), a circuit board (204), and a rear housing plate (202). The front housing cover (201) comprises a vertical wall (206) comprising a first opening (212a); a peripheral wall (207) traversely extending from a periphery and a rear surface (209) of the vertical wall (206) to a terminal end (208); and a bezel frame (104) traversely extending from a front surface (205) of the vertical wall (206) and comprising a front bezel wall (214) surrounded by a peripheral bezel wall (215) traversely extending from the first opening (212a) to the front bezel wall (214), the front bezel wall (214) comprises a second opening (212b) aligned with and smaller than the first opening (212a). The button assembly (203) comprises two parallel longitudinal portions (243) interconnected via at least one lateral portion (244); and at least one button (241a) comprising a free unconnected end (246) and an attached end (247) connected to the at least one lateral portion (244); wherein the button assembly (203) is located within the bezel frame (104) with the at least one button (241a) protruding through the second opening (212b) in the bezel frame (104), wherein front surfaces of the longitudinal portions (243) of the button assembly (203) abut an inner surface of the front bezel wall (214) of the bezel frame (104). The circuit board (204) is located within the bezel frame (104) behind the button assembly (203), wherein rear surfaces of the longitudinal portions (243) of the button assembly (203) abut a front surface of the circuit board (204) along its outer edges, wherein the at least one button (241a) comprises an abutment (248) extending from its rear surface and configured for depressing a tactile switch (250a) located on a front surface (252) of the circuit board (204). The rear housing plate (202) is mounted within the front housing cover (201) such that a periphery of the rear housing plate (202) fits within and is surrounded by the peripheral wall (207) of the front housing cover (201) and a rear surface (211) of the rear housing plate (202) is substantially flush with the terminal end (208) of the peripheral wall (207) of the front housing cover (201), wherein the rear housing plate (202) comprises a platform wall (271) transversely extending from a front surface (210) of the housing plate (202) into the bezel frame (104), wherein the platform wall (271) abuts a rear surface (253) of the circuit board (204).

According to yet another aspect of the embodiments, a battery powered control device (100) configured to be mounted on a vertical surface is provided. The battery powered control device (100) comprises a front housing cover (201), a button assembly (203), a circuit board (204), and a rear housing plate (202). The front housing cover (201) comprises a vertical wall (206) comprising a first opening (212a); a peripheral wall (207) traversely extending from a periphery and a rear surface (209) of the vertical wall (206) to a terminal end (208); a bezel frame (104) traversely extending from the first opening (212a) at a front surface (205) of the vertical wall (206) and comprising a second opening (212b) aligned with and smaller than the first opening (212a); and a battery receiving channel (226) located on one side of the bezel frame (104) and configured for guiding a battery (213) through a battery receiving opening (230) in the front housing cover (201) and into a battery compartment (272) within the battery powered control device (100). The button assembly (203) comprises at least one button (241a), wherein the button assembly (203) is located within the bezel frame (104) with the at least one button (241a) protruding through the second opening (212b) in the bezel frame (104). The circuit board (204) is located within the bezel frame (104) behind the button assembly (203). The rear housing plate (202) is mounted within the front housing cover (201) such that a periphery of the rear housing plate (202) fits within and is surrounded by the peripheral wall (207) of the front housing cover (201), wherein the rear housing plate (202) comprises a platform wall (271) transversely extending from a front surface (210) of the housing plate (202) into the bezel frame (104), wherein the platform wall (271) abuts a rear surface (253) of the circuit board (204) substantially along its periphery and at a distance from the rear housing plate (202) forming a space (274) between the circuit board (204) and the rear housing plate (202), wherein the battery compartment (272) is located within the space (274) formed by the platform wall (271), wherein the platform wall (271) comprises a side opening (273) configured for permitting the insertion of the battery (213) into the battery compartment (272).

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
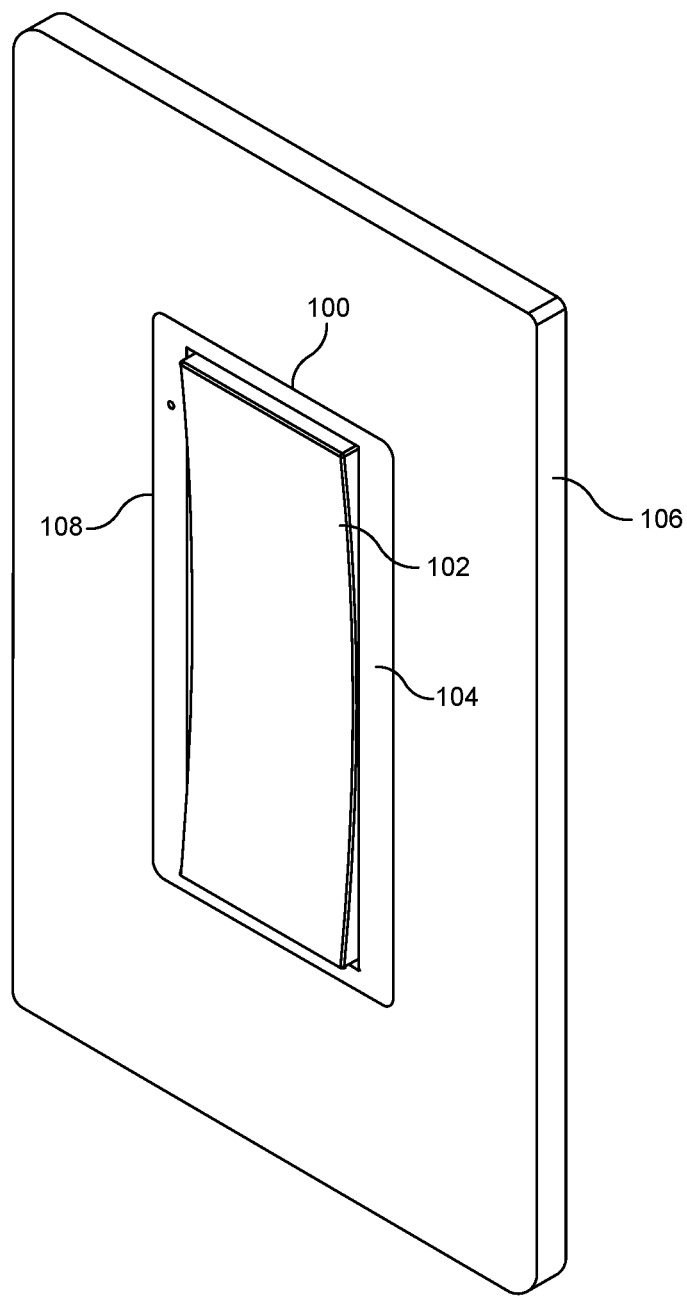

FIG. 1 illustrates a wall mounted battery powered control device with a faceplate according to an embodiment.

Figure 2:
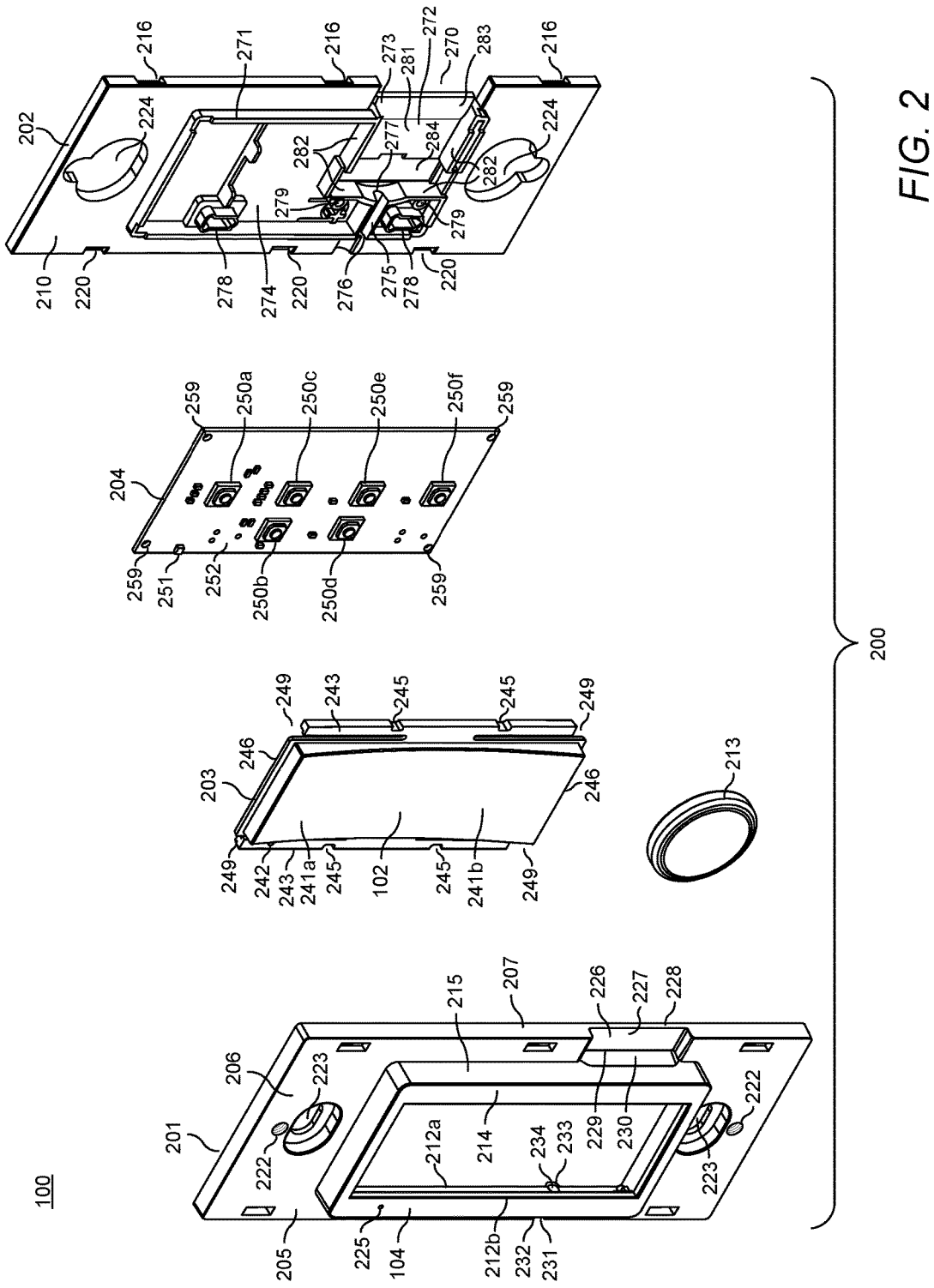

FIG. 2 illustrates an exploded perspective front view of the control device according to an embodiment.

Figure 3:
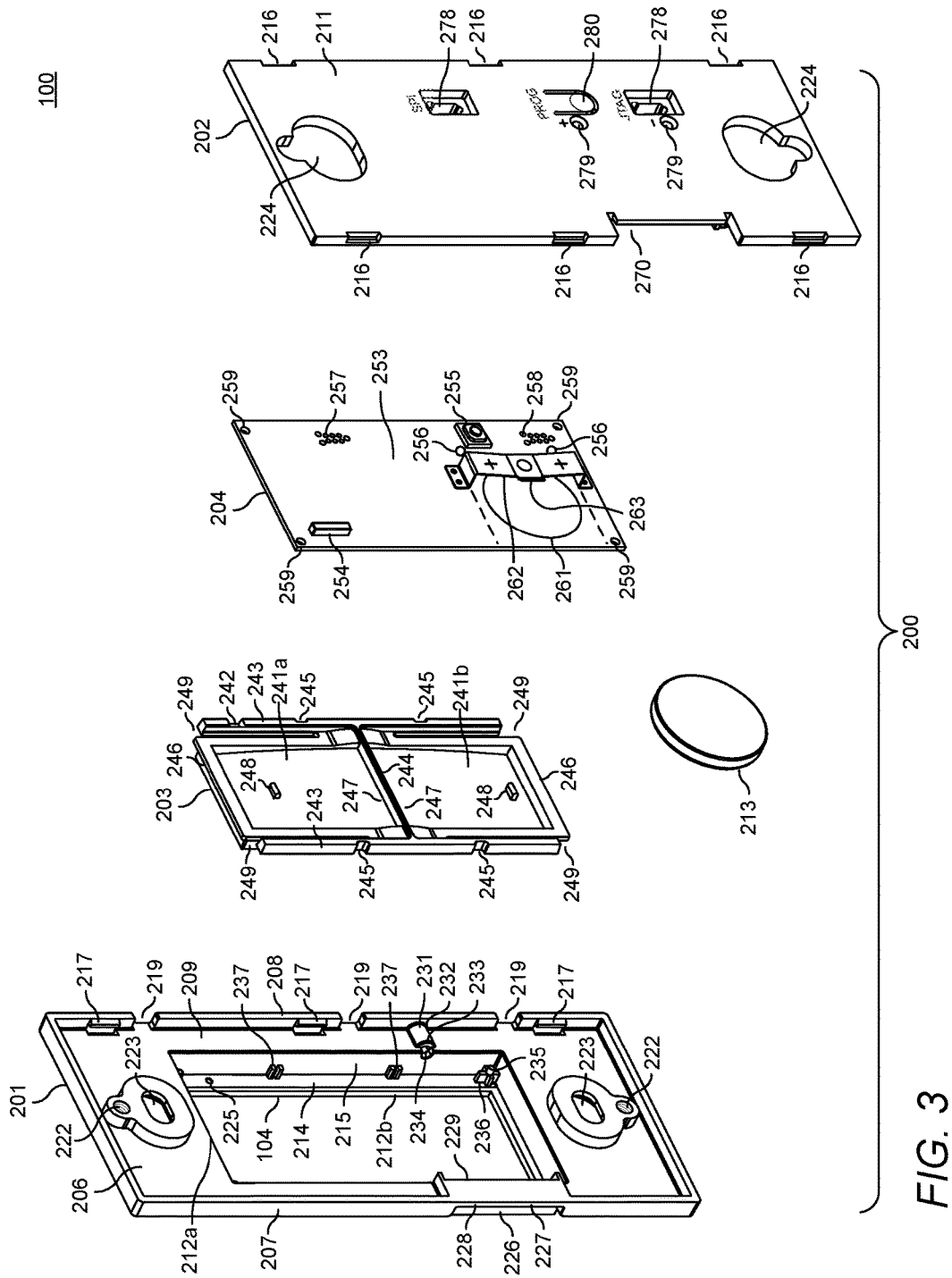

FIG. 3 illustrates an exploded perspective rear view of the control device according to an embodiment.

FIG. 4 illustrates a perspective front view of the control device according to an embodiment.

FIG. 5 illustrates a right side view of the control device according to an embodiment.

FIG. 6 illustrates a left side view of the control device according to an embodiment.

FIG. 7 illustrates a top view of the control device according to an embodiment.

Figure 8:
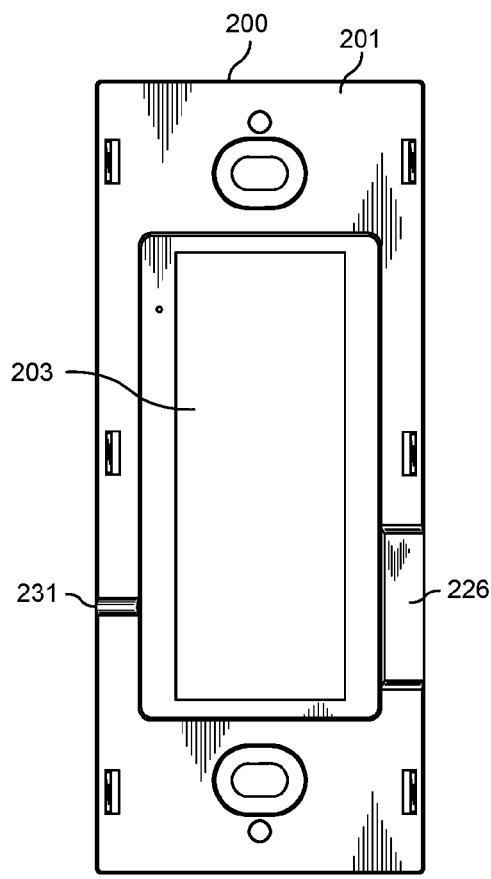

FIG. 8 illustrates a front view of the control device according to an embodiment.

Figure 9:
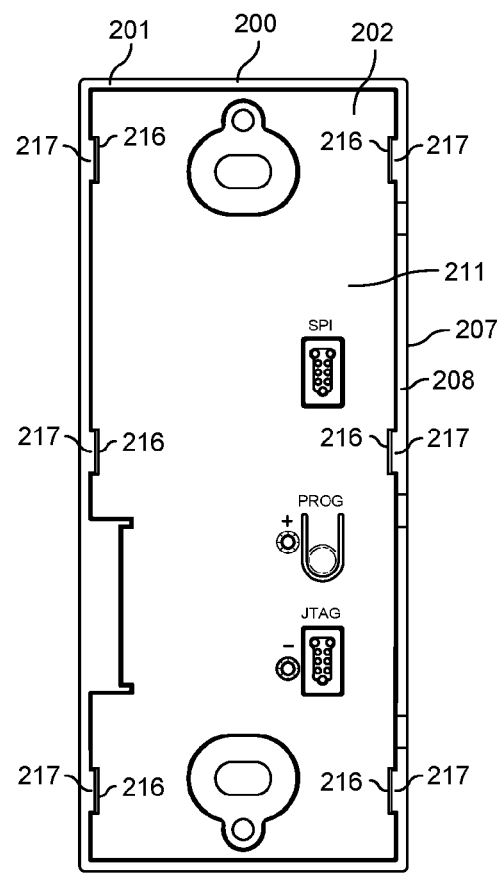

FIG. 9 illustrates a rear view of the control device according to an embodiment.

Figure 10:
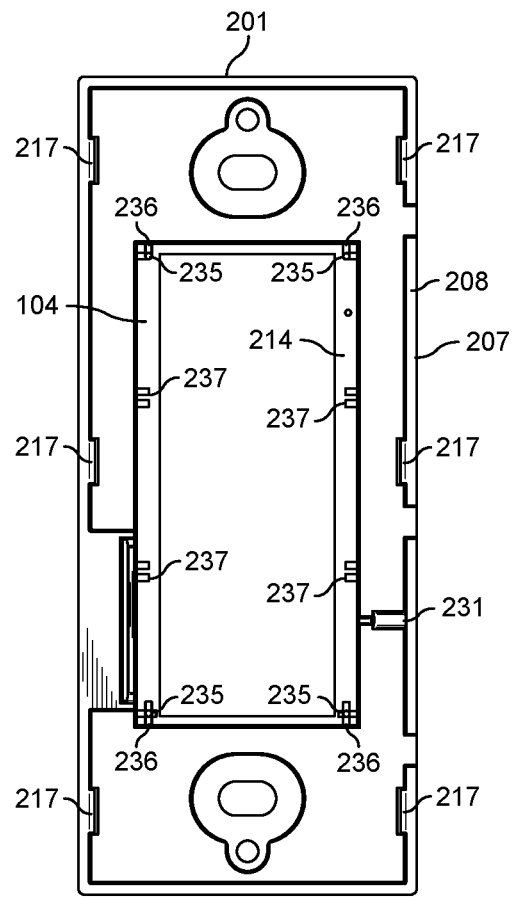

FIG. 10 illustrates a rear view of a front housing cover of the control device according to an embodiment.

Figure 11A:
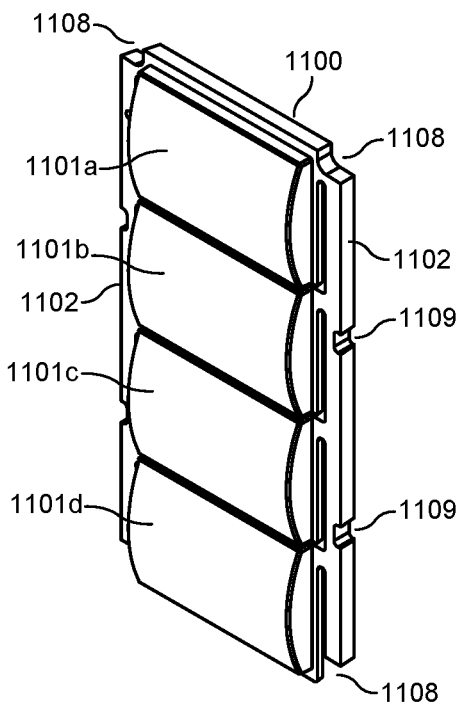

FIG. 11A illustrates a front view of a four-button assembly according to an embodiment.

Figure 11B:
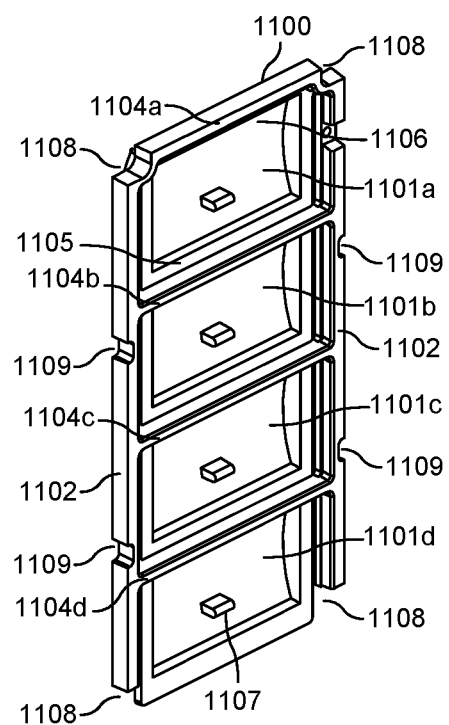

FIG. 11B illustrates a rear view of the four-button assembly according to an embodiment.

Figure 12A:
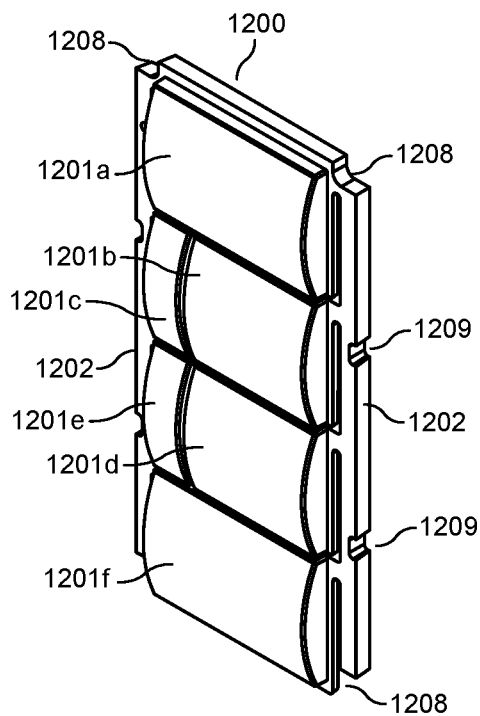

FIG. 12A illustrates a front view of a six-button assembly according to an embodiment.

Figure 12B:
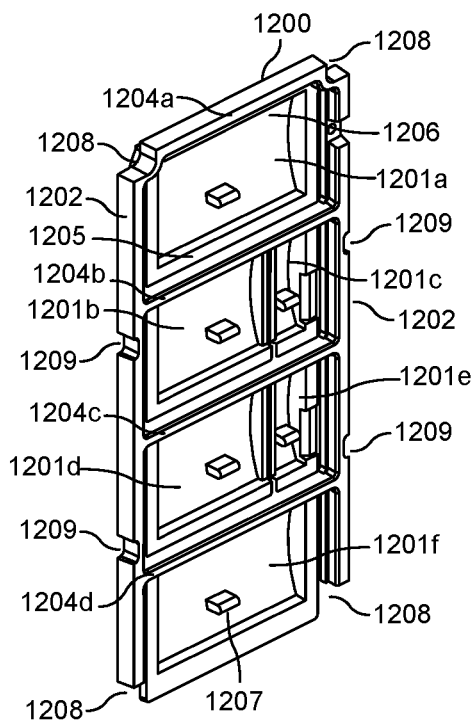

FIG. 12B illustrates a rear view of the six-button assembly according to an embodiment.

Figure 13A:
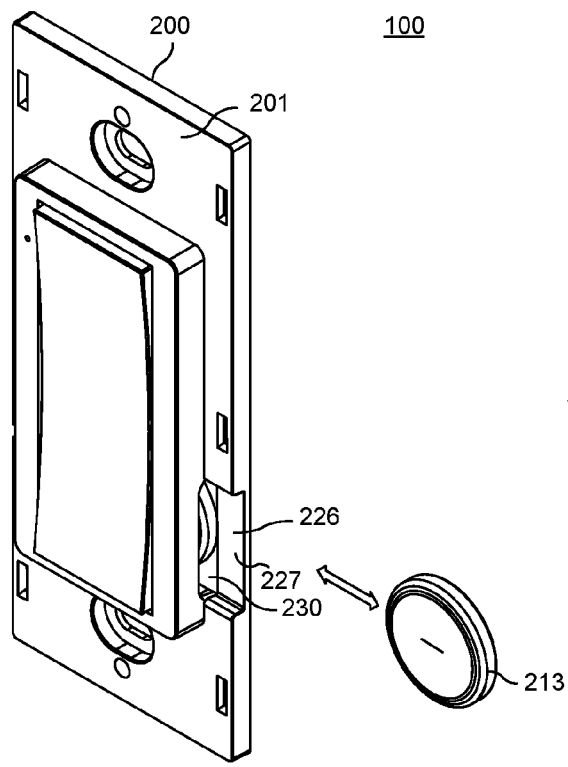

FIG. 13A illustrates a process of inserting a battery into the battery powered control device according to an embodiment.

Figure 13B:
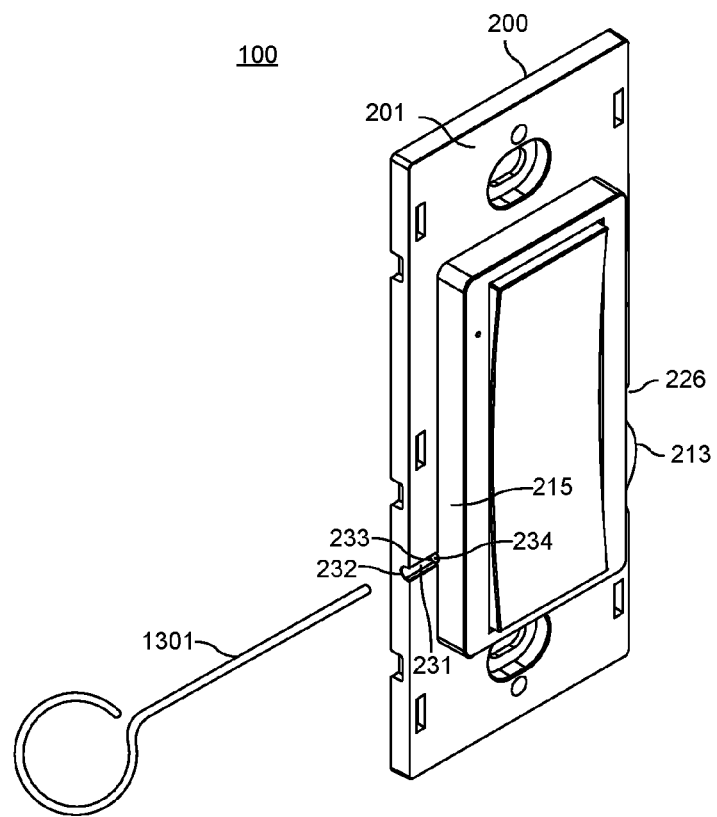

FIG. 13B illustrates a process of extracting the battery out of the battery powered control device according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

- 100 Battery Powered Control Device
- 102 Rocker Switch Actuator
- 104 Bezel Frame
- 106 Faceplate
- 108 Opening
- 200 Housing Assembly
- 201 Front Housing Cover
- 202 Rear Housing Plate
- 203 Button Assembly
- 204 Circuit Board
- 205 Front Surface
- 206 Vertical Wall
- 207 Peripheral Wall
- 208 Terminal End
- 209 Rear Surface
- 210 Front Surface
- 211 Rear Surface
- 212a Opening
- 212b Opening
- 213 Battery
- 214 Front Wall
- 215 Peripheral Wall
- 216 Notches
- 217 Hooks
- 219 Grooves
- 220 Notches
- 221 Spaces
- 222 Threaded Holes
- 223 Slots
- 224 Openings
- 225 Orifice
- 226 Battery Receiving Channel
- 227 Recessed Wall
- 228 First End
- 229 Second End
- 230 Battery Receiving Opening
- 231 Battery Extracting Channel
- 232 First End
- 233 Second End
- 234 Battery Extracting Opening
- 235 Posts
- 236 Projections
- 237 Projections
- 241a-b Buttons
- 242 Orifice
- 243 Longitudinal Portions
- 244 Lateral Portion
- 245 Wells
- 246 Free End
- 247 Attached End
- 248 Abutments
- 249 Notched Corners
- 250a-f Tactile Switches
- 251 Light Emitting Diode
- 252 Front Surface
- 253 Rear Surface
- 254 Antenna
- 255 Tactile Switch
- 256 Contact Terminals
- 257 First Interface
- 258 Second Interface
- 259 Holes
- 261 Metal Contact Surface
- 262 Battery Retainer Strap
- 263 Battery Guiding Flange
- 270 Cutout
- 271 Platform Wall
- 272 Battery Compartment
- 273 Side Opening
- 274 Space
- 275 Battery Extracting Channel
- 276 First End
- 277 Second End
- 278 Openings
- 279 Openings
- 280 Button
- 281 Rear Wall
- 282 Peripheral Side Walls
- 283 Retaining Ridge
- 284 Retaining Recess
- 1100 Four-Button Assembly
- 1101a-d Four Buttons
- 1102 Longitudinal Portions
- 1104a-d Lateral Portions
- 1105 Free End
- 1106 Attached End
- 1107 Abutments
- 1108 Notched Corners 1109 Wells
1200 Six-Button Assembly
1201a-f Six Buttons
1202 Longitudinal Portions
1204a-d Lateral Portions
1205 Free End
1206 Attached End
1207 Abutments
1208 Notched Corners
1209 Wells
1301 Pin List of Acronyms Used in the Specification in Alphabetical Order The following is a list of the acronyms used in the specification in alphabetical order.
AV Audiovisual
HVAC Heating, Ventilation and Air Conditioning
JTAG Joint Test Action Group
LED Light Emitting Diode
RF Radio Frequency
SPI Serial Peripheral Interface
V Volts
VAC Volts, Alternating Current

MODE(S) FOR CARRYING OUT THE INVENTION

For 40 years Creston Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of battery powered control devices, but are not limited thereto, except as may be set forth expressly in the appended claims. While the battery powered control devices of the present embodiments are described below as controlling lighting, the battery powered control devices can control numerous other electronic devices or loads, including one or more of heating, ventilation and air conditioning (HVAC), shading, security, appliances, door locks, and audiovisual (AV) equipment, among others.

Referring now to FIG. 1, there is shown an illustrative wall mounted battery powered control device 100 with a faceplate 106. The battery powered control device 100 may serve as a user interface to associated loads or load controllers in a space. In an illustrative embodiment, the battery powered control device 100 may be configured to receive control commands directly from a user and transmit the control command to a load (such as a light, fan, window blinds, etc.) or to a load controller (not shown) electrically connected the load to control the load based on the control commands. In an illustrative embodiment, the battery powered control device 100 may be configured as a lighting switch or dimmer having a rocker switch actuator 102 installed within a bezel frame 104. The rocker switch actuator 102 can be used to control the on/off status of the load. Alternatively, or in addition, the rocker switch actuator 102 can be used to control a dimmer setting of the load. In another embodiment, battery powered control device 100 can be configured as a keypads comprising a plurality of buttons corresponding to different lighting scenes or to control various load devices. Other configuration for actuators or buttons may be used, as will be described below. The battery powered control device 100 may be covered using a faceplate 106. The faceplate 106 may comprise an opening 108 sized and shaped for receiving the bezel frame 104 therein. The faceplate 106 may further comprise hooks (not shown) configured for snapping the faceplate 106 onto the batter powered control device 100. In an illustrative embodiment, the bezel frame 104, the rocker switch actuator 102, and/or the faceplate 106 can be fabricated from plastic, where the particular color of the plastic is selected to aesthetically match an overall installation. Alternatively, other materials may be used, such as metal, glass, wood, fabric, or the like.

According to an aspect of the present embodiments, the battery powered control device 100 comprises a compact profile (see, e.g., FIGS. 4-7). The battery powered control device 100 (excluding the protruding rocker switch actuator 102 or keypad buttons) may comprise depth that does not exceed the depth of a conventional decorative style faceplate, which is typically around 0.25 inches. As such, the control device 100 may be installed directly on a wall or another flat surface, such as glass, sheetrock, or the like, and be covered by a conventional faceplate. The small depth of the battery powered control device 100 enables it to resemble a conventional keypad or lighting switch that typically comprises a back housing portion, which fits within a junction box and includes an internal power supply and terminals configured for connecting to high voltage wiring.

FIGS. 2 and 3 illustrate exploded views of the battery powered control device 100 without the faceplate 106, where FIG. 2 illustrates an exploded perspective front view of the control device 100 and FIG. 3 illustrates an exploded perspective rear view of the control device 100. FIGS. 4 through 9 illustrate an assembled battery powered control device 100 without the faceplate 106, where FIG. 4 illustrates a perspective front view of the control device 100, FIG. 5 illustrates a right side view of the control device 100, FIG. 6 illustrates a left side view of the control device 100, FIG. 7 illustrates a top view of the control device 100, FIG. 8 illustrates a front view of the control device 100, and FIG. 9 illustrates a rear view of the control device 100.

Referring to FIGS. 2 and 3, the battery powered control device 100 comprises a housing assembly 200 having a front housing cover 201 and a rear housing plate 202. The housing assembly 200 further comprises a button assembly 203, which may comprise a rocker switch actuator 102 as shown in FIGS. 2 and 3. The housing assembly 200 also comprises a circuit board 204. The front housing cover 201, the rear housing plate 202, and button assembly 203 may be fabricated from plastic. Alternatively, other materials may be used, such as metal, glass, wood, fabric, or the like.

The front housing cover 201 may comprise a vertical wall 206 comprising a substantially flat front surface 205 surrounded around its periphery by a peripheral wall 207. The peripheral wall 207 may extend perpendicularly from the rear surface 209 of the vertical wall 206 to a terminal end 208 (FIG. 3) at a distance sufficient to span the thickness of the rear housing plate 202. Accordingly, when assembled, the rear housing plate 202 may fit within the front housing cover 201 such that the periphery of the rear housing plate 202 fits within and is surrounded by the peripheral wall 207 of the front housing cover 201. According to an embodiment, when assembled the rear surface 211 of the rear housing plate 202 is substantially flush with the terminal end 208 of the peripheral wall 207 of the front housing cover 201 as shown in FIGS. 5 and 6. The peripheral wall 207 may comprise hooks 217 extending from its inner surface. For example, the peripheral wall 207 may comprise six hooks 217 (FIG. 10). However, other number of hooks 217 may be used, such as eight or four hooks 217. The rear surface 211 of the rear housing plate 202 may comprise notches 216 along its periphery, sized and positioned to receive hooks 217 of the front housing cover 201 such that the rear housing plate 202 may be snapped into the front housing cover 201. Additionally, the peripheral wall 207 of the front housing cover 201 may comprise three grooves or cutouts 219 on at least one of its sides and the outer edges of front surface 210 of the rear housing plate 202 may comprise correspondingly aligned three notches 220. Each cutout 219 may be positioned in proximity to each corresponding hook 217, for example, slightly below each corresponding hook 217. When assembled, each pair of corresponding grooves 219 and notches 220 form a space 221 therebetween (FIG. 6). The space 221 may be used to disengage the rear housing plate 202 from the front housing cover 201, if necessary. Specifically, a flat object, such as a flat tip of a screw driver, may be inserted into the space 221 and turned to disengage hooks 217 from corresponding notches 216.

The front housing cover 201 may comprise threaded holes 222 configured for receiving threaded screws in order to attached a conventional faceplate to the front housing cover 201. In another embodiment, a snap-on face plate 106 (FIG. 1) may be used. In addition, the front housing cover 201 may comprise slots 223, and the rear housing plate 202 may comprise corresponding openings 224 extending therethrough which may be used for attaching the housing assembly 200 to a vertical surface, such as a wall, glass, sheetrock, or the like. Conveniently, the battery powered control device 100 may be attached to any vertical surface without the need of a junction box. Alternatively, the battery powered control device 100 may be installed to a junction box, or to a vertical surface using adhesives, double sided adhesive tapes, or the like.

The front housing cover 201 may further comprise an opening 212a surrounded by a bezel frame 104. The bezel frame 104 comprises a front wall 214 surrounded by a peripheral wall 215. The peripheral wall 215 of the bezel frame 104 extends traversely from the opening 212a at the front surface 205 of the front housing cover 201 to the front wall 214. The front wall 214 of the bezel frame 104 comprises an opening 212b aligned with and smaller than opening 212a at the front surface 205 of the front housing cover 201.

The front wall 214 of the bezel frame 104 may comprise at least one orifice 225 through which a status light indicator, such as a light emitting diode (LED) 251 located on circuit board 204, can be illuminated.

The front housing cover 201 may further comprise a battery receiving channel 226 comprising a recessed wall 227 parallel and settled below the front surface 205 of the vertical wall 206. The recessed wall 227 extends from a first end 228 that traverses the peripheral wall 207 to a second end 229 that terminates at a battery receiving opening 230 (FIGS. 2 and 5). According to an embodiment, the rear surface of the recessed wall 227 may be substantially on the same plane as the terminal end 208 of the peripheral wall 207 such that the battery receiving channel 226 does not extend past the terminal end 208 of the peripheral wall 207. The battery receiving opening 230 extends partially through the peripheral wall 215 of the bezel frame 104 and may be partially formed by the recess of the second end 229 of the battery receiving channel 226. The battery receiving channel 226 and the battery receiving opening 230 may be sized to receive a coin cell battery 213. Battery 213 may be a 22 mm battery, and more specifically a CR2032 button cell lithium battery rated at 3 Volt. Although other sized batteries may also be utilized. The battery receiving channel 226 may be formed on the right side of the bezel frame 104. According another embodiment, the battery receiving channel 226 may be formed on the left side of the bezel frame 104.

The front housing cover 201 may further comprise a battery extracting channel 231 aligned with the battery receiving channel 226 and located on an opposite side of the bezel frame 104 (see also FIGS. 5 and 6). The battery extracting channel 231 may be semi-tubular shaped and recessed into the front surface 205 of the vertical wall 206 of the front housing cover 201 (see also FIG. 13B). The battery extracting channel 231 may extend from a first end 232 notched in the peripheral wall 207 to a second end 233 that terminates at a battery extracting opening 234. Battery extracting opening 234 may partially cut into the peripheral wall 215 of the bezel frame 104 and may be partially formed by the recess of the second end 233 of the battery extracting channel 231. The battery extracting channel 231 and the battery extracting opening 234 may be sized to receive and guide a tubular object, such as a pin or a paper clip 1301 (FIG. 13B), as will be later described.

The inner surface of the bezel frame 104 may comprise four posts 235 extending from each corner of the inner surface of the front wall 214 (see also FIG. 10). These posts 235 may be attached to projections 236 that can reinforce the posts 235. These projections 236 may be configured to be shorter than the posts 235. The inner surface of the bezel frame 104 may further comprise projection 237 extending from the inner surface of the front wall 214 and/or the inner surface of the peripheral wall 215. Four projections 237 may extend at opposite sides of the bezel frame 104. Although other number of projections 237 may be used.

The button assembly 203 may comprise a rocker switch actuator 102 configuration. The button assembly 203 may comprise two parallel longitudinal portions 243 interconnected via at least one lateral portion 244, depending on the configuration and number of buttons. According to an embodiment, the rocker switch actuator 102 may comprise one lateral portion 244 connected at the middles of the two longitudinal portions 243. The rocker switch actuator 102 may comprise two buttons 241a and 241b, which on the front surface of the button assembly 203 can appear as a continuous rocker switch actuator 102. The buttons 241a and 241 each comprises a free unconnected end 246 and an attached end 247 connected to the lateral portion 244. The free end 246 of each button 241a and 241b is configured to slightly pivot with respect to the lateral portion 244 such that each button 241a and 241b can be depressed with respect to the lateral portion 244. Each button 241a and 241b can further comprise an abutment 248 extending from its rear surface configured for depressing a tactile switch 250a and 250f, respectively, located on circuit board 204. The button assembly 203 may be used to control an on/off operation of a load, for example a lighting load, a raise/lower operation of a shading load, or the like. In another embodiment, the button assembly 203 may be used to provide dimming capabilities.

Each longitudinal portion 243 of the button assembly 203 may comprise two wells 245 in their side edges sized to receive corresponding projections 237 of the front housing cover 201. Other number of wells may be used per each longitudinal portion 243, such as one well, three wells, or the like. Furthermore, the button assembly 203 may comprise notched corners 249 configured by limiting the lengths of the longitudinal portions 243. The notched corners 249 are sized to fit about posts 235 and projection 236. The button assembly 203 may further comprise an orifice 242 extending through one of the longitudinal portions 243 and configured to be aligned with orifice 225 in the bezel frame 104.

FIGS. 11A-B and 12A-B depict various key capsule or button assemblies that may be installed within the battery powered control device 100 in accordance with illustrative embodiments. In accordance with the present embodiments, a single battery powered control device 100 is configured for receiving any one of the button assemblies 203, 1100, or 1200, as required by an application. In order to perform simple on/off and/or up-down light dimming functions, an embodiment of the field configurable battery powered control device 100 can incorporate the rocker switch actuator 102 and/or a two-button mechanical actuator as part of a two-button assembly 203. In order to perform multiple functions, such as plurality of lighting scenes, light dimming, window shade control, or the like, a further embodiment of the field configurable battery powered control device 100 can incorporate a four-button assembly 1100 or a six-button assembly 1200. Other button assembly configurations are also contemplated by the present embodiments. As described herein, the wall-mounted control device 100 can be configured in the field, such as by an installation technician, in order to accommodate many site-specific requirements. Field configuration can include installation of an appropriate button assembly configuration based on the type of load, the available settings for the load, etc. Advantageously, such field configurability allows an installation technician to adapt the electrical device to changing field requirements (or design specifications).

The four-button assembly 1100 may for example provide an on/off lighting operation, a raise/lower shade operation, as well as two lighting scenes. The four-button assembly 1100 may comprise two parallel longitudinal portions 1102 interconnected via four lateral portions 1104a-d. The four-button assembly 1100 may comprise four buttons 1101a-d. The buttons 1101a-d may be tapered and arranged one below another in one column. The buttons 1101a-d may contain indicia (not shown) which may be printed, laser-engraved, or the like, to indicate the operation of the button. Each button 1101a-d may comprise a free unconnected end 1105 and an attached end 1106 connected to a corresponding one of the lateral portions 1104a-d. The free end 1105 of each button 1101a-d is configured to slightly pivot with respect to the lateral portion 1104a-d it is connected to such that each button 1101a-d can be depressed with respect to its respective lateral portion 1104a-d. Each button 1101a-d can further comprise an abutment 1107 extending from its rear surface configured for depressing a tactile switch 250a, 250c, 250e, and 250f, respectively, located on circuit board 204. Each longitudinal portion 1102 of the button assembly 1100 may comprise two wells 1109 in their side edges sized to receive corresponding projections 237 of the front housing cover 201. The four-button assembly 1100 may comprise notched corners 1108 configured by limiting the lengths of the longitudinal portions 1102. The notched corners 1108 are sized as to fit about posts 235 and projection 236.

The six-button assembly 1200 may for example provide an on/off lighting operation, dedicated raise/lower buttons, as well as two lighting scenes. Similarly, the six-button assembly 1200 may comprise two parallel longitudinal portions 1202 interconnected via four lateral portions 1204a-d. The six-button assembly 1200 may comprise six tapered buttons 1201a-f with a first button 1201a arranged at the top, a row of two buttons 1201b-c below, another row of two buttons 1201d-e arranged below, and another button 1201f arranged at the bottom. However, the arrangement of buttons 1201a-d may be configured in a different order, as desired. Each button 1201a-f may comprise a free unconnected end 1205 and an attached end 1206 connected to a corresponding one of the lateral portions 1204a-d. For example, the free end 1205 of first button 1201a may be connected to first lateral portion 1204a. The free ends 1205 of second and third buttons 1201b and 1201c may be connected to second lateral portion 1204b. The free ends 1205 of fourth and fifth buttons 1201d and 1201e may be connected to the third lateral portion 1204c. Finally, the free end 1205 of the sixth button 1201f may be connected to the fourth lateral portion 1204d. Alternatively, the buttons 1201a-f may be connected to lateral portions 1104a-d in different configurations. The free end 1205 of each button 1201a-f is configured to slightly pivot with respect to the lateral portion 1204a-d it is connected to such that each button 1201a-f can be depressed with respect to its respective lateral portion 1204a-d. Each button 1201a-d can further comprise an abutment 1207 extending from its rear surface configured for depressing a tactile switch 250a-f located on circuit board 204. Each longitudinal portion 1202 of the button assembly 1200 may comprise two wells 1209 in their side edges sized to receive corresponding projections 237 of the front housing cover 201. The six-button assembly 1200 may comprise notched corners 1208 configured by limiting the lengths of the longitudinal portions 1202. The notched corners 1208 are sized as to fit about posts 235 and projection 236.

According to an embodiment, the various button assemblies may share the same circuit board layout. The front surface 252 of the circuit board 204 may comprise a plurality of micro-switches or tactile switches 250a-f located on the circuit board 204 at locations corresponding to the abutments 248, 1107, and 1207 of the button assemblies 203, 1100, and 1200, respectively. For example, the circuit board 204 may contain six tactile switches 250a-f to accommodate button assemblies 203, 1100, and 1200. However, other number of switches may be used to accommodate other button configurations. The two-button keypad assembly 203 may expose buttons 250a and 250f, while the other buttons are not used. Accordingly, when either buttons 241a-b on button assembly 203 are pressed, the abutments 248 depress one of the corresponding switches 250a and 250f. The four-button keypad assembly 1100 may expose buttons 250a, 250c, 250e, and 250f, while the other buttons are not used. The six-button keypad assembly 1200 may expose all six buttons 250a-f. Each switch 250a-f may be programmed to receive control commands to control an operation of a load. For example, each switch 250a-f may be programmed for an up/down or left/right "rocker" action, single press operation, press/hold mode, or the like.

The front surface 252 of the circuit board 204 may also contain at least one status light indicator, such as a multi-colored LED 251, configured for visually indicating the status of the battery powered control device 100 to the user. For example, if a button is pressed, the LED 251 may briefly light green. If the battery 213 is low (e.g., <5% life remaining) the LED 251 may blink red three times. The LED 251 may also indicate whether the control device 100 is trying to join a network, when it is configured, or the like. Additional status light indicators may also be provided, for example, along the side of the bezel frame 104 of the keypad to identify active switches or dimming levels.

The circuit board 204 may further include various circuit components configured for receiving commands and transmitting commands wirelessly to a load or a load controlling device. The circuit board 204 may contain a computer-readable medium, such as a tangible memory, that is configured to store computer-readable instructions. The computer-readable instructions can be executed by a microprocessor and/or other components of the battery powered control device 100. Upon execution, the computer-readable instructions can cause the control device 100 to perform various operations, such as controlling the load, extracting control information from a control signal, generating status information to be transmitted, etc. The rear surface 253 of the circuit board 204 may further contain an antenna 254 configured for transmitting commands to other electronic devices, such as loads or load control devices. The antenna 254 may comprise a radio frequency (RF) transceiver configured for bidirectional wireless communication over a wireless network using communication protocols, such as the ZigBee® protocol, the infiNET EX® protocol from Crestron Electronics, Inc. of Rockleigh, N.J., or the like.

The rear surface 253 of the circuit board 204 may also contain a tactile switch 255, which when depressed is configured to indicate to the microcontroller to enter a commissioning and/or programming mode. The rear surface 253 may further contain a pair of contact terminals 256 configured for receiving power from two probes connected to a power device such that the circuit board 204 may be tested by an installer without the use of a battery. Furthermore, the rear surface 253 may contain a first interface 257, such as a serial peripheral interface (SPI), through which the circuit board 204, and particularly the microcontroller of the battery powered control device 100, can be programmed. Additionally, the rear surface 253 may contain a second interface 258, such as a Joint Test Action Group (JTAG) interface, through which the circuit board 204 of the battery powered control device 100 can be tested, debugged, programmed with firmware, and receive firmware updates.

Furthermore, the rear surface 253 of the circuit board 204 may contain a metal contact surface 261 which may be configured for providing negative contact to a coin cell battery 213. The rear surface 253 of the circuit board 204 may further contain a battery retainer strap 262 positioned over the metal contact surface 261. The battery retainer strap 262 may be formed of metal and may be configured for retaining and providing a positive contact to a coin cell battery 213. The battery retainer strap 262 may comprise a battery guiding flange 263 extending from an edge of the battery retainer strap 262. The battery guiding flange 263 may be bent away from the metal contact surface 261 and is configured for guiding the coin cell battery 213 between the metal contact surface 261 and the battery retainer strap 262 to retain and provide power to the electronic components of the circuit board 204.

The circuit board 204 may comprise four holes 259 extending therethrough and located on each corner. The holes 259 are sized and configured for receiving the posts 235 extending from the inner surface of the bezel frame 104 of the front housing cover 201.

The rear housing plate 202 comprises a cutout 270 sized to receive the recessed wall 227 of the battery receiving channel 226 such that the recessed wall 227 resides substantially on the same plane as rear housing plate 202. The rear housing plate 202 comprises a substantially rectangular platform wall 271 transversely extending from the housing plate 202. The rectangular platform wall 271 may be sized to support the circuit board 204 substantially along its periphery and at a distance from the rear housing plate 202 forming a space 274 between the circuit board 204 and the rear housing plate 202. This space 274 provides room for the various electronic components of the circuit board 204. According to an embodiment, the majority of the circuit components of circuit board 204, other than the tactile switches 250*a-f* and indicator light 251, may be located on the rear surface 253 of the circuit board 204 and reside within space 274 to conserve space.

The rear housing plate 202 further comprises a battery compartment 272 formed within space 274 and sized to receive the battery retainer strap 262 as well as the battery 213. The battery compartment 272 may comprise a rear wall 281 formed in the rear housing plate 202 and peripheral side walls 282 surrounding the battery compartment 272. The rear wall 281 may comprise a smaller thickness than the rear housing plate 202 that substantially matches the thickness of the recessed wall 227 of the front housing cover 201. The platform wall 271 comprises a side opening 273 configured for permitting the insertion of the battery 213 into the battery compartment 272. The rear wall 281 may comprise a retaining ridge 283 slightly raised above the surface of the rear wall 281. The rear wall 281 way also comprise a retaining recess 284 recessed below the surface of the rear wall 281. The retaining recess 284 is sized and configured for receiving a portion of the battery retainer strap 262.

Space 274 further comprises a battery extracting channel 275 extending out of the front surface 210 of the rear housing plate 202 and aligned with the battery compartment 272. The battery extracting channel 275 may be semi-tubular in shape. The battery extracting channel 275 may extend from a first end 276 notched in the platform wall 271 to a second end 277 notched in a peripheral side wall 282 and terminates at the battery compartment 272. The battery extracting channel 231 and the battery extracting opening 234 may be sized to receive and guide a tubular object, such as a pin or a paper clip, as will be later described.

The rear housing plate 202 may comprise openings 278 extending therethrough configured for providing access to the first interface 257 and the second interface 258 at the rear surface 253 of the circuit board 204. Further, the rear housing plate 202 may comprise openings 279 extending therethrough configured for providing access to the contact terminals 256 at the rear surface 253 of the circuit board 204. In addition, the rear housing plate 202 may comprise a button 280 configured for contacting the tactile switch 255 at the rear surface 253 of the circuit board 204.

Assembly of the battery powered control device 100 consists of placing the button assembly 203 through the rear of opening 212*a* into the bezel frame 104 of the front housing cover 201. When so placed, the rocker switch actuator 102, and particularly buttons 241*a-b*, protrude through opening 212*b* of the bezel frame 104. Longitudinal portions 243 of the button assembly 203 abut the inner surface of the front wall 214 of bezel frame 104. Orifice 242 in one of the longitudinal portion 243 is aligned with orifice 225 in the front wall 214 of the bezel frame 104. Posts 235 and projections 236 extending from the inner surface of the front wall 214 of bezel frame 104 in turn extend through respective notched corners 249 formed in the button assembly 203. Projections 237 of the bezel frame 104 also extend through respective wells 245 formed in the longitudinal portions 243 of the button assembly 203. Projections 236 and 237 lock the button assembly 203 in place inside the bezel frame 104.

The circuit board 204 may then be placed through the rear of opening 212a into the rear of the bezel frame 104 of the front housing cover 201 over the button assembly 203. When so placed, the front surface 252 of the circuit board 204 rests against the longitudinal portions 243. The posts 235 of bezel frame 104 extend through holes 259, locking circuit board 204 in place. The tactile switches 250a and 250f align with the abutments 248 of buttons 241a and 241b, respectively. As such, pressing button 241a causes its abutment 248 to engage tactile switch 250a. Similarly, pressing button 241b causes its abutment 248 to engage tactile switch 250f. The metal contact surface 261 and the battery retainer strap 262 are horizontally aligned with the battery receiving channel 226.

Then, the rear housing plate 202 is snapped over the circuit board 204 into the front housing cover 201, and particularly inside the peripheral wall 207. Hooks 217 of the front housing cover 201 are snapped onto notches 216 of the rear housing plate 202. The rear surface 211 of the rear housing plate 202 is aligned with the terminal end 208 of the peripheral wall 207 of the front housing cover 201. The platform wall 271 is inserted through opening 212a of the front housing cover 201 and abuts the circuit board 204 to hold it in place within bezel frame 104. The battery compartment 272 of the rear hosing plate 202 fits over the metal contact surface 261 and the battery retainer strap 262. A portion of the battery retainer strap 262 is retained by the retaining recess 284 in the rear wall 281 in the battery compartment 272. Also recessed wall 227 of the front housing cover 201 fits within cutout 270 of the rear housing plate 202 and gets aligned with the rear wall 281 of the battery compartment 272. Similarly, battery extracting channel 231 of the front housing cover 201 gets aligned with the battery extracting channel 275 of the rear housing plate 202. Openings 278 in the rear housing plate 202 align with first and second interfaces 257 and 258 on the circuit board 204. Similarly, opening 279 in the rear housing plate 202 align with the contact terminals 256 on the circuit board 204. Button 280 in the rear housing plate 202 aligns with the tactile switch 255.

As seen in FIG. 5, when assembled the battery powered control device 100 comprises a compact profile. Other than the protruding buttons, the remainder of the components of the control device 100 reside within the front housing cover 201. According to an embodiment, the button assembly 203 (excluding the protruding buttons), the circuit board 204, and the platform wall 274 of the rear housing plate 202 fit within the bezel frame 104. Accordingly, the combination of the depth of the button assembly 203 (excluding the protruding buttons), the thickness of the circuit board 204, and the depth of the platform wall of the rear housing plate 202 does not exceed the width of the peripheral wall 215 of the bezel frame 104. The front housing cover 201, and thereby the battery powered control device 100 (excluding the protruding buttons), may comprise depth that does not exceed the depth of a conventional decorative style faceplate, which is typically around 0.25 inches. The small depth of the battery powered control device 100 enables it to be installed on a surface of a wall while still resembling a conventional keypad or lighting switch.

FIG. 13A illustrates the process of inserting the battery 213 into the battery powered control device 100. The battery 213 is inserted through the battery receiving channel 226 over the recessed wall 227 of the front housing cover 201 and through the battery receiving opening 230. The battery guiding flange 263 guides the battery 213 between the metal contact surface 261 and the battery retainer strap 262 to contact with the circuit board 204 (FIG. 3). When fully inserted, the battery 213 resides within the battery compartment 272 surrounded by peripheral side walls 282 and between the rear wall 281 of the rear housing plate 202 and the rear surface 253 of the circuit board 204. The battery 213 is retained within the battery compartment 272 by the retaining ridge 283, which prevents the battery 213 from being dislodged (FIG. 3).

FIG. 13B illustrates the process of extracting the battery 213 out of the battery powered control device 100. To extract the battery 213 a longitudinal pin 1301 may be inserted through the battery extracting channel 231 of the front housing cover 201 and through the battery extracting opening 234. Then the battery extracting channel 275 formed in the rear housing plate 202 guides the pin 1301 into the battery compartment 272. The pin 1301 is then further pressed through the battery extracting opening 234 into the battery compartment 272 to push the battery 213 out of the battery compartment 272 through the battery receiving opening 230 and out of the battery powered control device 100. In an alternative embodiment, instead of using a pin 1301, any other sufficiently thin tubular object may be used, such as a paper clip, a rigid wire, or the like.

INDUSTRIAL APPLICABILITY

The disclosed embodiments provide a system, software, and a method for a scalable building control system that can be scaled up from a single room control to an entire building control. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A battery powered control device configured to be mounted on a vertical surface, comprising:
   a front housing cover comprising:
      a vertical wall comprising a first opening,
      a peripheral wall traversely extending from a periphery and a rear surface of the vertical wall to a terminal end, and
      a bezel frame traversely extending from a front surface of the vertical wall and comprising a front bezel wall surrounded by a peripheral bezel wall traversely extending from the first opening to the front bezel wall, the front bezel wall comprises a second opening aligned with and smaller than the first opening;
   a button assembly comprising at least one button, wherein the button assembly is located within the bezel frame with the at least one button protruding through the second opening in the bezel frame;
   a circuit board located within the bezel frame behind the button assembly; and
   a rear housing plate mounted within the front housing cover such that a periphery of the rear housing plate fits within and is surrounded by the peripheral wall of the front housing cover, wherein the rear housing plate comprises a platform wall transversely extending from a front surface of the housing plate into the bezel frame, wherein the platform wall abuts a rear surface of the circuit board.

2. The battery powered control device of claim 1, wherein the rear housing plate fits within the front housing cover such that a rear surface of the rear housing plate is substantially flush with the terminal end of the peripheral wall of the front housing cover.

3. The battery powered control device of claim 1, wherein the peripheral wall comprises hooks extending from its inner surface, wherein a rear surface of the rear housing plate comprises notches formed along its periphery and sized and configured to receive the hooks of the front housing cover such that the rear housing plate is snapped into the front housing cover.

4. The battery powered control device of claim 1, wherein the platform wall supports the circuit board substantially along its periphery and at a distance from the rear housing plate forming a space between the circuit board and the rear housing plate, wherein the space provides room for electronic components extending from the circuit board.

5. The battery powered control device of claim 1, wherein at least two corners of an inner surface of the bezel frame comprise posts extending therefrom, wherein the button assembly comprises at least two notched corners sized to fit about posts, and wherein at least two corners of the circuit board comprise holes extending therethrough and sized and configured for receiving the posts.

6. The battery powered control device of claim 1, wherein an inner surface of the bezel frame comprises at least two projections extending therefrom, wherein the button assembly comprises at least two wells in its side edges sized and configured to receive the corresponding projections.

7. The battery powered control device of claim 1, wherein the button assembly comprises two parallel longitudinal portions interconnected via at least one lateral portion, wherein the at least one button comprises a free unconnected end and an attached end connected to the at least one lateral portion, wherein the free end is configured to pivot with respect to the lateral portion.

8. The battery powered control device of claim 7, wherein front surfaces of the longitudinal portions of the button assembly abut an inner surface of the front bezel wall of the bezel frame, and wherein rear surfaces of the longitudinal portions of the button assembly abut a front surface of the circuit board along its outer edges.

9. The battery powered control device of claim 1, wherein the button assembly comprises a rocker switch actuator comprising two buttons sharing a continuous front surface.

10. The battery powered control device of claim 1, wherein the at least one button comprises an abutment extending from its rear surface and configured for depressing a tactile switch located on a front surface of the circuit board.

11. The battery powered control device of claim 10 configured for receiving one of a plurality of button assemblies of various button counts and layouts, wherein the front surface of the circuit board comprises a plurality of tactile switches at locations corresponding to locations of abutments of each button of the plurality of button assemblies.

12. The battery powered control device of claim 1, wherein the front housing cover comprises a battery receiving opening located on one side of the bezel frame and configured for receiving a battery into a battery compartment located within the battery powered control device.

13. The battery powered control device of claim 12, wherein when fully inserted the battery resides within the battery compartment between the front surface of the rear housing plate and the rear surface of the circuit board.

14. The battery powered control device of claim 12, wherein the front housing cover comprising a battery receiving channel comprising a recessed wall settled below the front surface of the vertical wall and configured for guiding the battery through the battery receiving opening, wherein the recessed wall extends from a first end that is notched into the peripheral wall to a second end that terminates at the battery receiving opening.

15. The battery powered control device of claim 14, wherein the battery receiving opening extends partially through the peripheral bezel wall of the bezel frame and is partially formed by a recess of the second end of the battery receiving channel.

16. The battery powered control device of claim 14, wherein a rear surface of the recessed wall is substantially on the same plane as the terminal end of the peripheral wall of the front housing cover.

17. The battery powered control device of claim 14, wherein the rear housing plate comprises a cutout sized to receive the recessed wall of the battery receiving channel such that a rear surface of the recessed wall resides substantially on the same plane as a rear surface of the rear housing plate.

18. The battery powered control device of claim 14, wherein the battery compartment is located within the platform wall of the rear housing plate and comprises a rear wall formed in the rear housing plate and peripheral side walls traversely extending from the front surface of the rear housing plate and surrounding the battery compartment, wherein the platform wall comprises a side opening configured for permitting the battery to be inserted into the battery compartment.

19. The battery powered control device of claim 18, wherein a front surface of the recessed wall of the battery receiving channel is aligned with a front surface of the rear wall of the battery compartment.

20. The battery powered control device of claim 19, wherein the rear wall comprises a thickness substantially equal to a thickness of the recessed wall of the battery receiving channel.

21. The battery powered control device of claim 18, wherein the rear wall of the battery compartment comprises a retaining ridge slightly raised above a front surface of the rear wall and configured for retaining the battery within the battery compartment.

22. The battery powered control device of claim 18, wherein the rear surface of the circuit board comprises a metal contact surface and a battery retainer strap positioned over the metal contact surface such that when inserted the battery resides between the metal contact surface and the battery retainer strap, wherein the battery compartment of the rear hosing plate fits over the metal contact surface and the battery retainer strap.

23. The battery powered control device of claim 22, wherein the battery retainer strap comprises a battery guiding flange extending from an edge of the battery retainer strap and bent away from the metal contact surface, wherein the battery guiding flange is configured for guiding the battery between the metal contact surface and the battery retainer strap.

24. The battery powered control device of claim 22, wherein the rear wall of the battery compartment comprises a retaining recess recessed below a front surface of the rear wall and sized and configured for receiving a portion of the battery retainer strap.

25. The battery powered control device of claim 12, wherein the front housing cover comprises a battery extracting opening in communication with the battery compartment and aligned with and located on an opposite side of the bezel frame from the battery receiving opening, wherein the battery extracting opening is configured for receiving a longitudinal object into the battery compartment to push the battery out of the battery compartment through the battery receiving opening.

26. The battery powered control device of claim 14, wherein the front housing cover comprises a first battery extracting channel recessed into the front surface of the vertical wall and aligned with and located on an opposite side of the bezel frame from the battery receiving channel, wherein the first battery extracting channel is configured for guiding a longitudinal object through a battery extracting opening in the front housing cover and into the battery compartment to push the battery out of the battery compartment through the battery receiving opening, wherein the first battery extracting channel extends from a first end notched in the peripheral wall of the front housing cover to a second end that terminates at the battery extracting opening.

27. The battery powered control device of claim 26, wherein the battery extracting opening is partially cut into the peripheral bezel wall of the bezel frame and is partially formed by the recess of the second end of the first battery extracting channel.

28. The battery powered control device of claim 26, wherein the rear housing plate comprises a second battery extracting channel traversely extending from the front surface of the rear housing plate and longitudinally extending from a first end aligned with the first battery extracting channel to a second end aligned with the battery compartment, wherein the first end of the second battery extracting channel is notched in the platform wall and wherein the second end of the second battery extracting channel is notched in a peripheral side wall of the battery compartment.

29. The battery powered control device of claim 1, wherein the battery powered control device is configured for being covered by a faceplate comprising an opening, wherein the bezel frame is sized and shaped to fit within the faceplate opening such that a front surface of the front bezel wall is substantially flush with a front surface of the faceplate, and wherein the battery powered control device, excluding the at least one button protruding from the bezel frame, is configured for substantially residing within the faceplate.

30. A battery powered control device configured to be mounted on a vertical surface, comprising:
　a front housing cover comprising:
　　a vertical wall comprising a first opening,
　　a peripheral wall traversely extending from a periphery and a rear surface of the vertical wall to a terminal end, and
　　a bezel frame traversely extending from a front surface of the vertical wall and comprising a front bezel wall surrounded by a peripheral bezel wall traversely extending from the first opening to the front bezel wall, the front bezel wall comprises a second opening aligned with and smaller than the first opening;
　a button assembly comprising:
　　two parallel longitudinal portions interconnected via at least one lateral portion, and
　　at least one button comprising a free unconnected end and an attached end connected to the at least one lateral portion,
　　wherein the button assembly is located within the bezel frame with the at least one button protruding through the second opening in the bezel frame, wherein front surfaces of the longitudinal portions of the button assembly abut an inner surface of the front bezel wall of the bezel frame;
　a circuit board located within the bezel frame behind the button assembly, wherein rear surfaces of the longitudinal portions of the button assembly abut a front surface of the circuit board along its outer edges, wherein the at least one button comprises an abutment extending from its rear surface and configured for depressing a tactile switch located on a front surface of the circuit board; and
　a rear housing plate mounted within the front housing cover such that a periphery of the rear housing plate fits within and is surrounded by the peripheral wall of the front housing cover and a rear surface of the rear housing plate is substantially flush with the terminal end of the peripheral wall of the front housing cover, wherein the rear housing plate comprises a platform wall transversely extending from a front surface of the housing plate into the bezel frame, wherein the platform wall abuts a rear surface of the circuit board.

31. A battery powered control device configured to be mounted on a vertical surface, comprising:
 a front housing cover comprising:
  a vertical wall comprising a first opening,
  a peripheral wall traversely extending from a periphery and a rear surface of the vertical wall to a terminal end,
  a bezel frame traversely extending from the first opening at a front surface of the vertical wall and comprising a second opening aligned with and smaller than the first opening, and
  a battery receiving channel located on one side of the bezel frame and configured for guiding a battery through a battery receiving opening in the front housing cover and into a battery compartment within the battery powered control device;
 a button assembly comprising at least one button, wherein the button assembly is located within the bezel frame with the at least one button protruding through the second opening in the bezel frame;
 a circuit board located within the bezel frame behind the button assembly; and
 a rear housing plate mounted within the front housing cover such that a periphery of the rear housing plate fits within and is surrounded by the peripheral wall of the front housing cover, wherein the rear housing plate comprises a platform wall transversely extending from a front surface of the housing plate into the bezel frame, wherein the platform wall abuts a rear surface of the circuit board substantially along its periphery and at a distance from the rear housing plate forming a space between the circuit board and the rear housing plate, wherein the battery compartment is located within the space formed by the platform wall, wherein the platform wall comprises a side opening configured for permitting the insertion of the battery into the battery compartment.

\* \* \* \* \*